United States Patent [19]
Butter et al.

[11] Patent Number: 5,381,480
[45] Date of Patent: Jan. 10, 1995

[54] SYSTEM FOR TRANSLATING ENCRYPTED DATA

[75] Inventors: Adrian S. Butter, Binghamton, N.Y.; Brian S. Finkel, Chapel Hill, N.C.; Chang-Yung Kao, Boulder, Colo.; Sivarama K. Kodukula, Austin, Tex.; James P. Kuruts, Forest City, Pa.

[73] Assignee: International Business Machines Corporation, Armonk, N.Y.

[21] Appl. No.: 124,151

[22] Filed: Sep. 20, 1993

[51] Int. Cl.6 ............................................. H04L 9/16
[52] U.S. Cl. ..................................... 380/37; 380/47; 380/49; 380/50
[58] Field of Search ............... 380/24, 4, 37, 28, 44–50

[56] References Cited
U.S. PATENT DOCUMENTS

| | | | |
|---|---|---|---|
| 4,352,952 | 10/1982 | Boone et al. | 380/49 |
| 4,423,287 | 12/1983 | Zeidler | 380/49 |
| 4,558,176 | 12/1985 | Arnold et al. | 380/49 |
| 4,663,501 | 5/1987 | Pospischil | 380/50 |
| 4,731,843 | 3/1988 | Holmquist | 380/28 |
| 4,807,290 | 2/1989 | Pospischil | 380/46 |
| 4,837,821 | 6/1989 | Kage | 380/49 |
| 4,918,728 | 4/1990 | Matyas et al. | 380/45 |
| 5,003,596 | 3/1991 | Wood | 380/28 |
| 5,008,936 | 4/1991 | Hamilton et al. | 380/50 |
| 5,128,996 | 7/1992 | Rosenow et al. | 380/49 |
| 5,142,579 | 8/1992 | Anderson | 380/30 |
| 5,148,479 | 9/1992 | Bird et al. | 380/48 |
| 5,161,193 | 11/1992 | Lampson et al. | 380/49 |
| 5,177,791 | 1/1993 | Yeh et al. | 380/45 |

OTHER PUBLICATIONS

American National Standard For Information Systems–Data Encryption Algorithm–Modes of Operation, pp. 5–16.
IBM Corporate Specification C–H 0–3031–002 1190-1-1-Key Controlled Cryptographic Algorithm.
IBM Technical Disclosure Bulletin vol. 14, No. 3, Aug. 1971, "Hardware Implementation Of A Crypotgraphic System", by J. L. Smith.

Primary Examiner—Salvatore Cangialosi
Attorney, Agent, or Firm—Arthur J. Samodovitz

[57] ABSTRACT

A system translates a first group of cipher blocks based on a first encryption key to a second group of respective cipher blocks based on a second encryption key. Respective cipher blocks of the first and second groups represent the same data. The system comprises decryption hardware for sequentially decrypting the cipher blocks of the first group based on the first key. Encryption hardware is coupled to receive decrypted blocks output from the decryption hardware and sequentially encrypts the decrypted blocks into respective cipher blocks of the second group based on the second encryption key. A control unit controls the encryption hardware to encrypt the decrypted blocks into the respective cipher blocks of the second group while the decryption hardware decrypts cipher blocks of the first group. Consequently, decryption and encryption operations occur in parallel and the translation process is expedited.

21 Claims, 9 Drawing Sheets

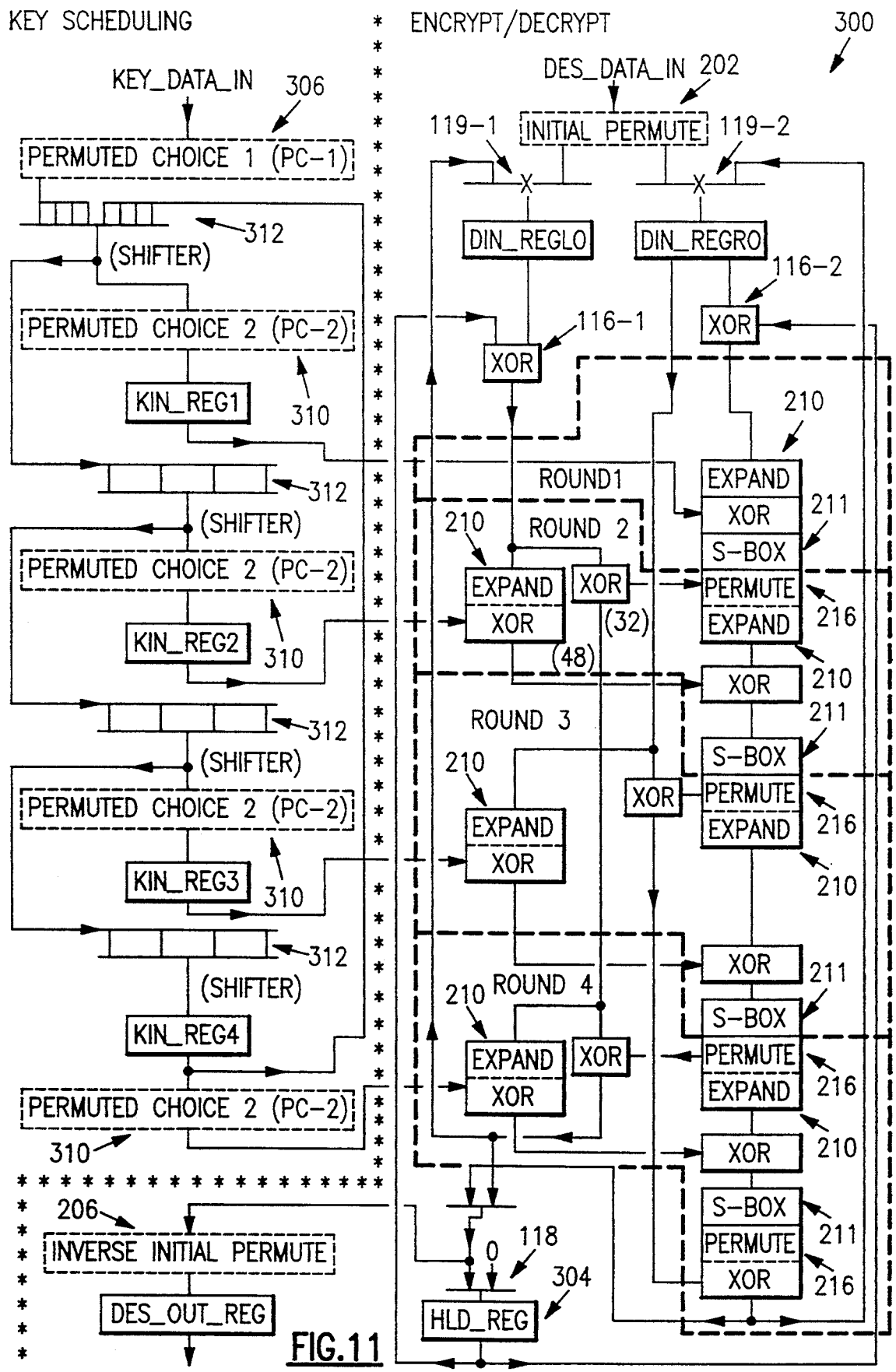

SYSTEM FOR TRANSLATING ENCRYPTED DATA

BACKGROUND OF THE INVENTION

The invention relates generally to cryptography, and deals more particularly with a technique for rapidly decrypting data using one encryption/decryption key and re-encrypting the data using a different encryption/decryption key.

Private data is often encrypted or enciphered using an encryption algorithm and encryption/decryption key before transmission from a first site to a second site. Consequently, if an unauthorized party without the key (which is also required for decryption) intercepts the data, the party cannot understand the data even if the proper decryption algorithm is known. The data is subsequently decrypted or deciphered at the second site by an authorized party using the proper decryption algorithm and the original key. In some cases, the data must be transmitted from the second site to a third site which does not have the original key but instead has a second key. In such a case, the encrypted data received at the second site must be decrypted using the original key, and then re-encrypted using the second key and transmitted to the third site. This process is commonly called "translation". Then, the third site can decrypt the data using the second key.

There are many known techniques or algorithms for data encryption. For example, American National Standard for Information Systems (ANSI) standard X3.92-1981 defines one popular data encryption algorithm (DEA) for a data encryption standard (DES). This algorithm provides four modes of operation (depending on the level of security required): electronic codebook (ECB) mode, cipher block chaining (CBC) mode, cipher feedback (CFB) mode and output feedback (OFB) mode.

FIG. 1 illustrates the prior art CBC mode of data encryption. The CBC mode is particularly useful for encrypting a large block of data because this mode eliminates patterns caused by the encrypting and such patterns would facilitate decryption by unauthorized parties. The data to be encrypted is divided into 64 bit blocks $10a, b \ldots n$ at a site 11. The first block is exclusive ORed (12a) with a 64 bit initialization value (IV) 14a (which is a pre-set "intermediate value", typically all zeros), and then passed to a DES encryption unit 16a. An encryption key 15a was previously loaded into the DES encryption unit 16a, and the encryption unit 16a encrypts the result of the exclusive OR unit 12a using key 15a and a variety of logical operations and permutations that constitute the encryption algorithm. DES encryption unit 16a is further defined in "Federal Information Processing Standard (FIPS) "Data Encryption Standard", by National Bureau of Standards, US Department of Commerce January, 1977, and "Data Encryption Algorithm" by ANSI, standard #X-3.92-1981. These documents are hereby incorporated by reference as part of the present disclosure. The output of DES encryption unit 16a is the encrypted form or "cipher block" of the first data block 10a. The encrypted form is transmitted to a site 18 for decryption as described below. At site 11, this first cipher block also forms the second intermediate value and is exclusive ORed (12b) with the second data block 10b. The result is processed by another DES encryption unit 16b having the same key 15a and encryption algorithm. The output of encryption unit 16b is transmitted to site 18 for decryption. At site 11, this second cipher block output from encryption unit 16b also forms the second intermediate value and is exclusive ORed (12c) with the third data block. This process is repeated serially for all encryption units 16. Thus, the encryption of the data blocks $10a, b, \ldots n$ proceeds sequentially using multiple encryption units.

At site 18, the first encrypted block is processed by a DES decryption unit 24a using a decryption key 15b (which is identical to the key 15a used for encryption) and complimentary logical operations and permutations. DES decryption unit 24a is further described in the foregoing FIPS and ANSI documents. The output is then exclusive ORed (25a) with the same 64 bit initialization value (or pre-set intermediate value) to yield the original data block 10a. Likewise the second encrypted block is processed by an identical DES decryption unit 24b loaded with key 15b. The output of decryption unit 24b is exclusive ORed (25b) with the first encrypted data block or cipher block (which is the second intermediate value) to yield the original data block 10b. Likewise the third encrypted block is processed by an identical DES decryption unit. The output is exclusive ORed with the second encrypted data block or cipher block to yield the third original data block. This process is repeated for all remaining cipher blocks.

FIG. 2 illustrates a prior art technique for translating at a site 28 an input cipher block to another cipher block using a different key. Data blocks are encrypted at site 11 as illustrated in FIG. 1 and then sent to a buffer 29 at site 28 illustrated in FIG. 2. Then, each cipher block is processed by a single DES unit 27 (configured for decryption) loaded with the key 15b and also stored in a buffer 31 as an intermediate value for decryption of the next cipher block. The output of decryption unit 27 is exclusive ORed (32p) with the initialization value (or pre-set intermediate value for the first block). This completes the decryption of the first cipher block. Another encryption using a different key follows in the translation process. The result of exclusive OR gate 32p is exclusive ORed (36p) with another initialization value (or preset intermediate value for the first data block) from buffer 42, and then processed by DES unit 27. However, now DES unit 27 is configured for encryption and loaded with a different encryption key 43a to yield the translated cipher block. The output of encryption unit 27 is stored in buffer 42 as the second intermediate value for encryption of the next data block and transmitted to another site for decryption and use there. The decryption at this other site can use a single decryption unit loaded with a key which is identical to key 43a, exclusive OR gate and buffer.

After the first data block is encrypted by DES unit 27, the next data block is decrypted by DES unit 27, and the foregoing process is repeated using the new intermediate values. It should be noted that the prior art process illustrated in FIG. 2 requires sequential decryption and encryption steps and this takes time.

Accordingly, a general object of the present invention is to provide a faster translation process from a cipher block based on one key to a cipher block based on a different key.

SUMMARY OF THE INVENTION

The invention resides in a system for translating a first group of cipher blocks based on a first encryption key to a second group of respective cipher blocks based on a second encryption key. Respective cipher blocks of the first and second groups represent the same data. The system comprises decryption hardware for sequentially decrypting the cipher blocks of the first group based on the first key. Encryption hardware is coupled to receive decrypted blocks output from the decryption hardware and sequentially encrypts the decrypted blocks into respective cipher blocks of the second group based on the second encryption key. A control unit controls the encryption hardware to encrypt the decrypted blocks into the respective cipher blocks of the second group while the decryption hardware decrypts cipher blocks of the first group. Consequently, decryption and encryption operations occur in parallel and the translation time is shortened compared to the foregoing prior art.

According to one feature of the present invention, the decryption hardware comprises a decryption unit coupled to receive the first group of cipher blocks and a first exclusive OR unit for exclusive ORing an output of the decryption unit with a previous cipher block in the first group in the sequence. The encryption hardware comprises an encryption unit, a second exclusive OR unit for exclusive ORing an output of the first exclusive OR unit with a previous cipher block in the second group in the sequence without intermediate buffering, and a third exclusive OR unit for exclusive ORing an output of the decryption unit with a previous cipher block in the first group in the sequence and a previous cipher block in the second group in the sequence. A buffer stores the previous cipher block in the second group from the encryption unit for exclusive ORing by the third exclusive OR unit. Selection circuitry selects the first and second exclusive OR units instead of the third exclusive OR unit when the previous cipher block of the second group is available from the encryption unit for the second exclusive OR unit. The selection circuitry selects the third exclusive OR unit instead of the first and second exclusive OR units when the previous cipher block of the second group is not available from the encryption unit for the second exclusive OR unit.

BRIEF DESCRIPTION OF THE FIGURES

FIG. 11 is a block diagram of another, enhanced DES unit which has been modified for inclusion within the translation hardware of FIGS. 3 and 5.

DETAILED DESCRIPTION OF THE PREFERRED EMBODIMENTS

Figure 3:
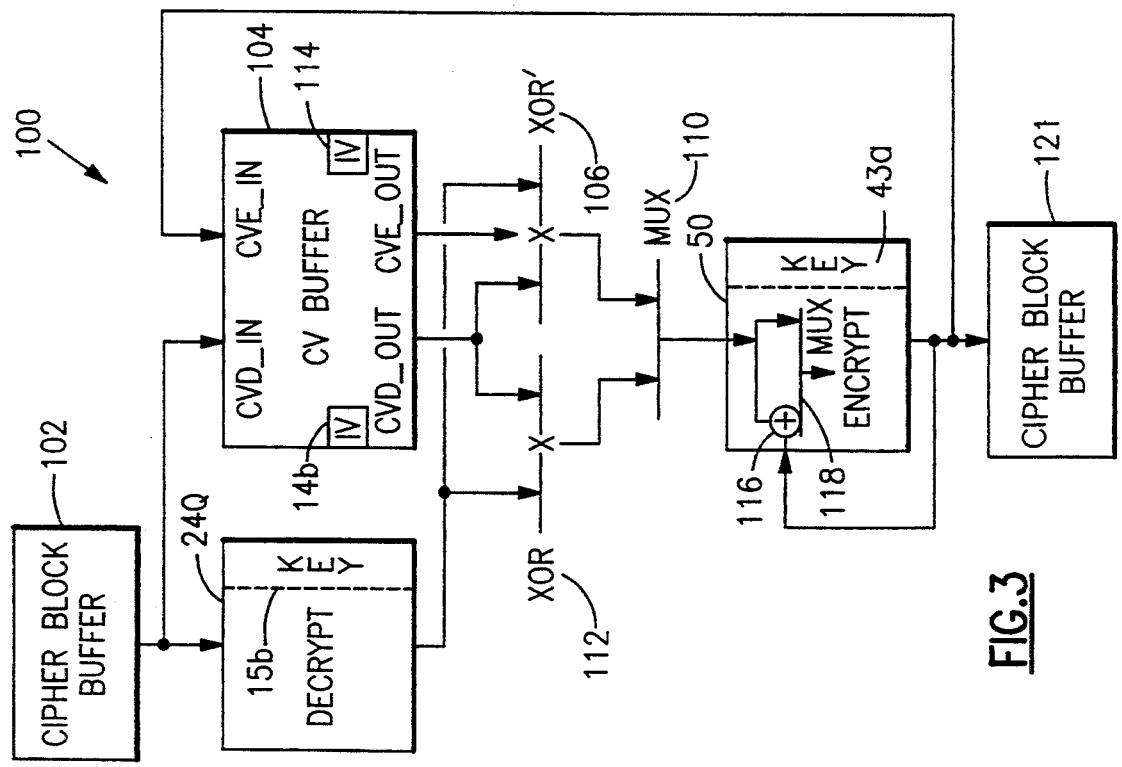
FIG. 3 is a block diagram of hardware for translating a cipher block based on one key to a cipher block based on another key, according to the present invention.

Referring now to the remaining Figures in detail wherein like reference numerals indicate like elements throughout the several views, FIG. 3 illustrates a cipher block translation system generally designated 100 according to the present invention. System 100 operates as follows. A multiplicity of cipher blocks generated by the encryption units 16a,b,c, . . . n are stored in an input cipher block buffer 102. However, if desired, the cipher blocks can be generated sequentially by a single encryption unit. An intermediate value or "chain value" (CV) buffer 104 stores the initialization value 14b (or pre-set intermediate value) used for decrypting the first cipher blocks from site 11. The first cipher block is processed by decryption unit 24q loaded with the key 15b (which is identical to the encryption key 15a at site 11). The first cipher block is also written to buffer 104 as the next intermediate value. The output of decryption unit 24q is exclusive ORed (using double stage exclusive OR unit 106) with the initialization value 14b required for the decryption and the initialization value 114 required for the encryption. Next, the output of the exclusive OR unit 106 is supplied via a multiplexor 110 to encryption unit 50 where the new cipher block based on the new key 43a is generated. This output is stored in buffer 104 as the intermediate value for encryption of the next block and transmitted to the third site for decryption using the same key as key 43a.

Figure 1:
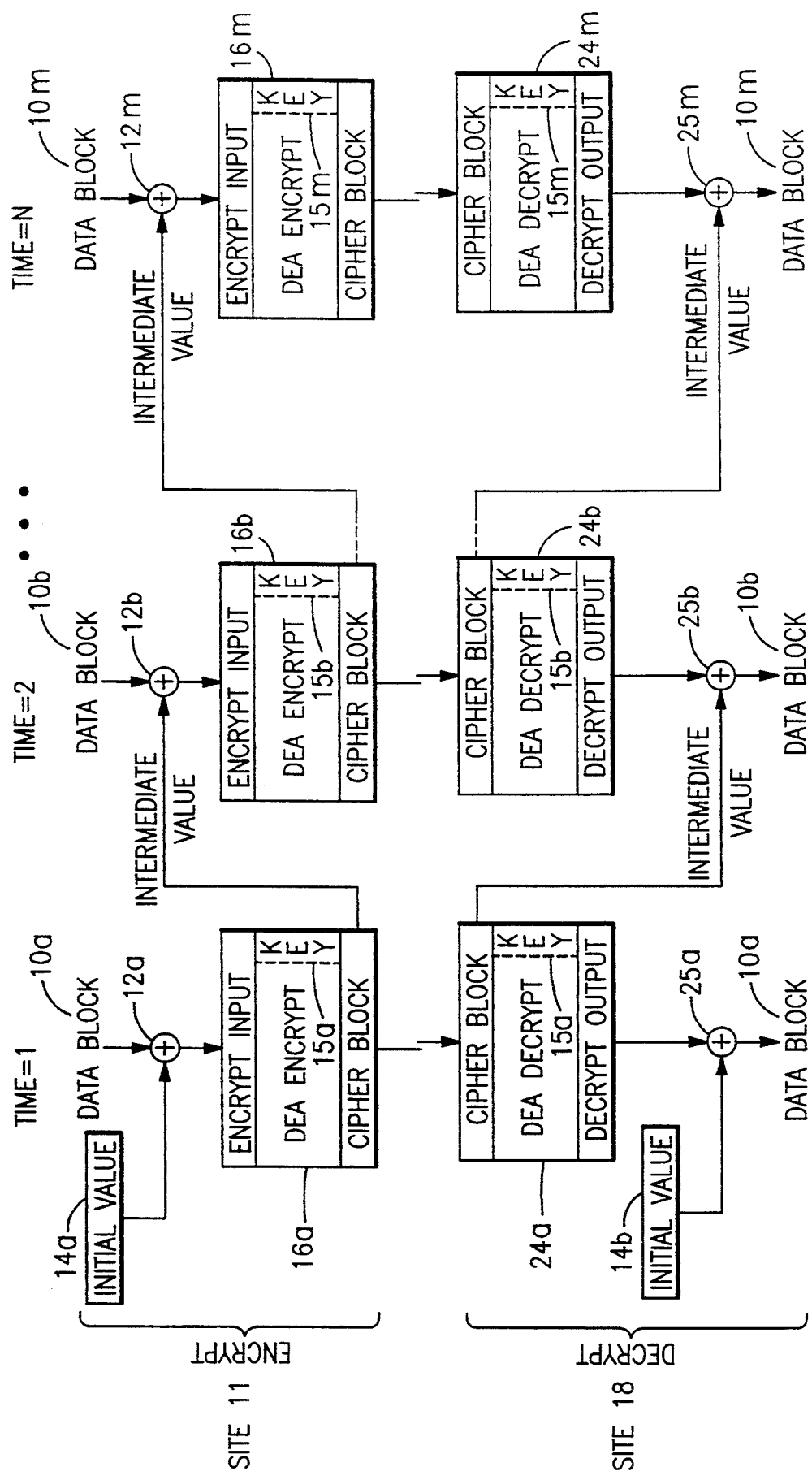
FIG. 1 is a block diagram of a prior art CBC system for data encryption at one site and decryption at another site using the prior art data encryption algorithm (DEA).
Figure 2:
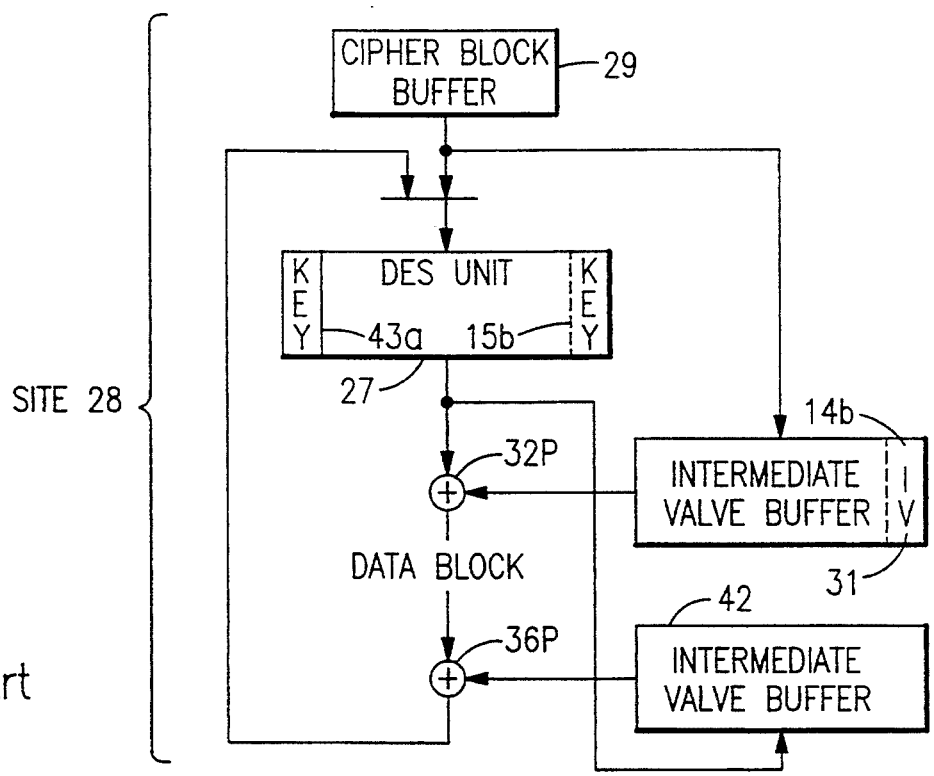
FIG. 2 is a block diagram of prior art hardware for translating a cipher block based on one key to a cipher block based on another key using the prior art DEA.

As described in more detail below, while encryption unit 50 performs the foregoing encryption of the first data block, the second cipher block is decrypted by decryption unit 24q. Moreover, as encryption unit 50 encrypts each data block (except the last), decryption unit 24q decrypts the next data block. Thus, the time consuming encryption and decryption processes are performed simultaneously for each block except the first and last. Consequently, for large messages, translation time is approximately half that of the prior art translation system of FIG. 2.

FIG. 3 also illustrates another, single stage exclusive OR unit 112 which is selected by multiplexor 110 (instead of double stage exclusive OR unit 106) for the second and subsequent blocks. Unit 112 is used to exclusive OR the output from decryption unit 24q and the intermediate value (provided by the previous cipher block) for the decryption process but does not exclusive OR the intermediate value for the subsequent encryption operation. Instead, the exclusive OR function for the encryption process is performed within encryption unit 50 by an internal exclusive OR unit 116 and selected by multiplexor 118. (Multiplexor 118 avoided the exclusive OR operation 116 for the first block when the double stage exclusive OR unit 106 was selected by multiplexor 110.) The intermediate value for the second block (and subsequent blocks) is fed back from the output of encryption unit 50 for the exclusive OR unit 116. It is more efficient to use internal exclusive OR unit 116 than external exclusive OR unit 106 because external exclusive OR unit 106 obtains its intermediate value from buffer 104 whereas internal exclusive OR unit 116 obtains its intermediate values directly from the output of encryption unit 50 without intervening, time consuming buffering.

FIG. 3 also illustrates that the output of encryption unit 50 is also fed back to CV buffer 104. This output forms intermediate values which are used along with two stage exclusive OR unit 106 (instead of single stage exclusive OR unit 112 and internal exclusive OR unit 116) when the proper intermediate value is not available from the output of encryption unit 50 when required by exclusive OR unit 116. This occurs when the decryption part of the translation process empties cipher block buffer 102 for a period such that the encryption process completes processing of the last block before another cipher block is available for encryption. In such a case, when this other block is encrypted, the last encrypted block will no longer be available from the output of encryption unit 43 to use as an intermediate value. Consequently, the intermediate value must be obtained from buffer 104 and the two stage exclusive OR unit 106 must be used.

Figure 4:
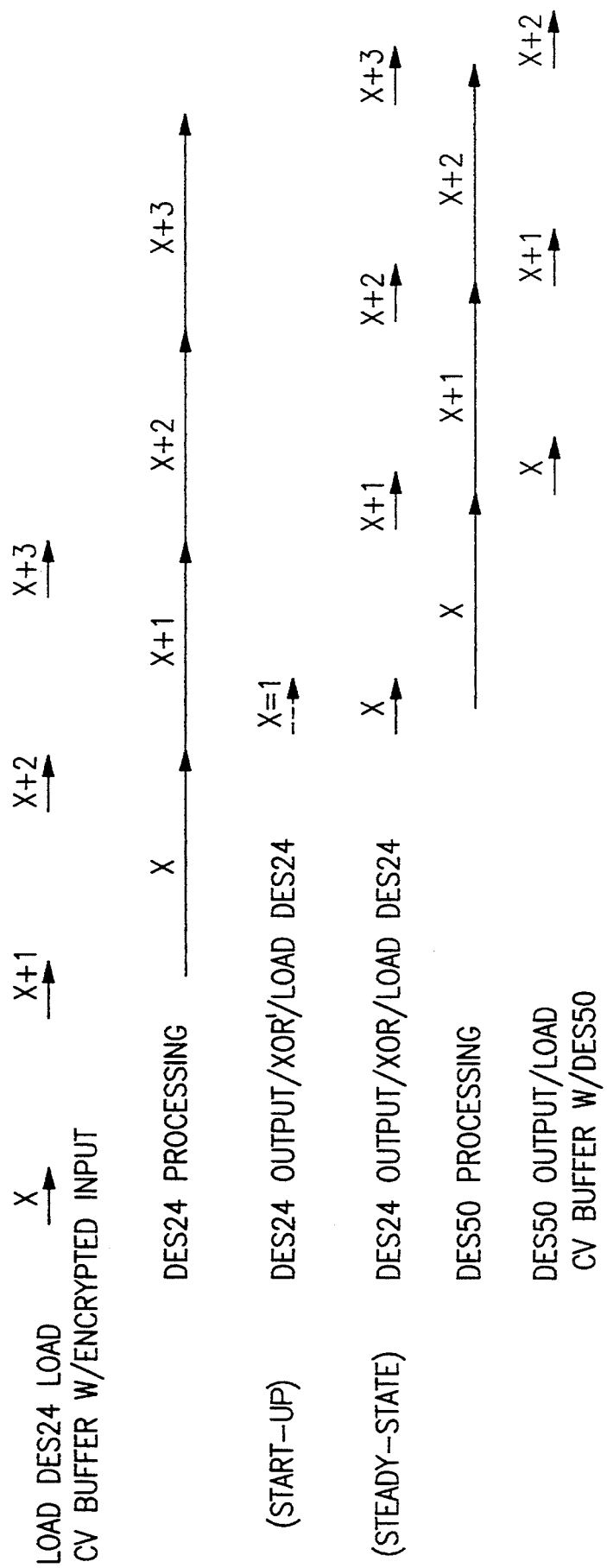
FIG. 4 is a timing diagram illustrating the timing of functions within the hardware of FIG. 3.

FIG. 4 illustrates in more detail the time saving overlap in processing by the encryption unit 24q and decryption unit 50 within system 100. Each of the vectors in FIG. 4 represents times that the respective operation occurs for the data blocks x, x+1, x+2 and x+3. The first row indicates the time in each of four successive cycles that cipher blocks x, x+1, x+2 and x+3 are loaded into decryption unit 24q and buffer 104. The second row indicates the times in four successive cycles that decryption unit 24q processes cipher blocks x, x+1, x+2 and x+3. As indicated by the length of the vectors in the second row, the processing by decryption unit 24q takes much longer than the loading operations of the first row. The third row indicates the time for the first data block only (x=1) that the first output from decryption unit 24q is available, exclusive OR unit 106 is operated and encryption unit 50 is loaded with the output of exclusive OR unit 106 via multiplexor 110. The fourth row indicates the times for subsequent data blocks (and x greater than 1) that the respective outputs from decryption unit 24q are available, exclusive OR unit 112 is operated and encryption unit 50 is loaded with the output of exclusive OR unit 112 via multiplexor 110. The fifth row indicates the times for three cycles that encryption unit 50 processes the outputs from exclusive OR unit 106 or 112 for three blocks x, x+1 and x+2. As indicated by the length of the vectors in the fifth row, the processing by encryption unit 24q takes the same time as the processing by decryption unit 24q and much longer than the loading operations of the first, third and fourth rows. The sixth row indicates the times for three cycles that the outputs from encryption unit 50 are available and loaded into output cipher block buffer 121 and CV buffer 104. As evident from the timing diagram of FIG. 4, the processing by decryption unit 24q and associated loading operations are overlapped with processing by encryption unit 50 and the associated loading operations. Consequently, the translation time is shortened considerably compared to the prior art of FIG. 2, and for long messages, the translation time is approximately half that of the prior art of FIG. 2.

Figure 5:
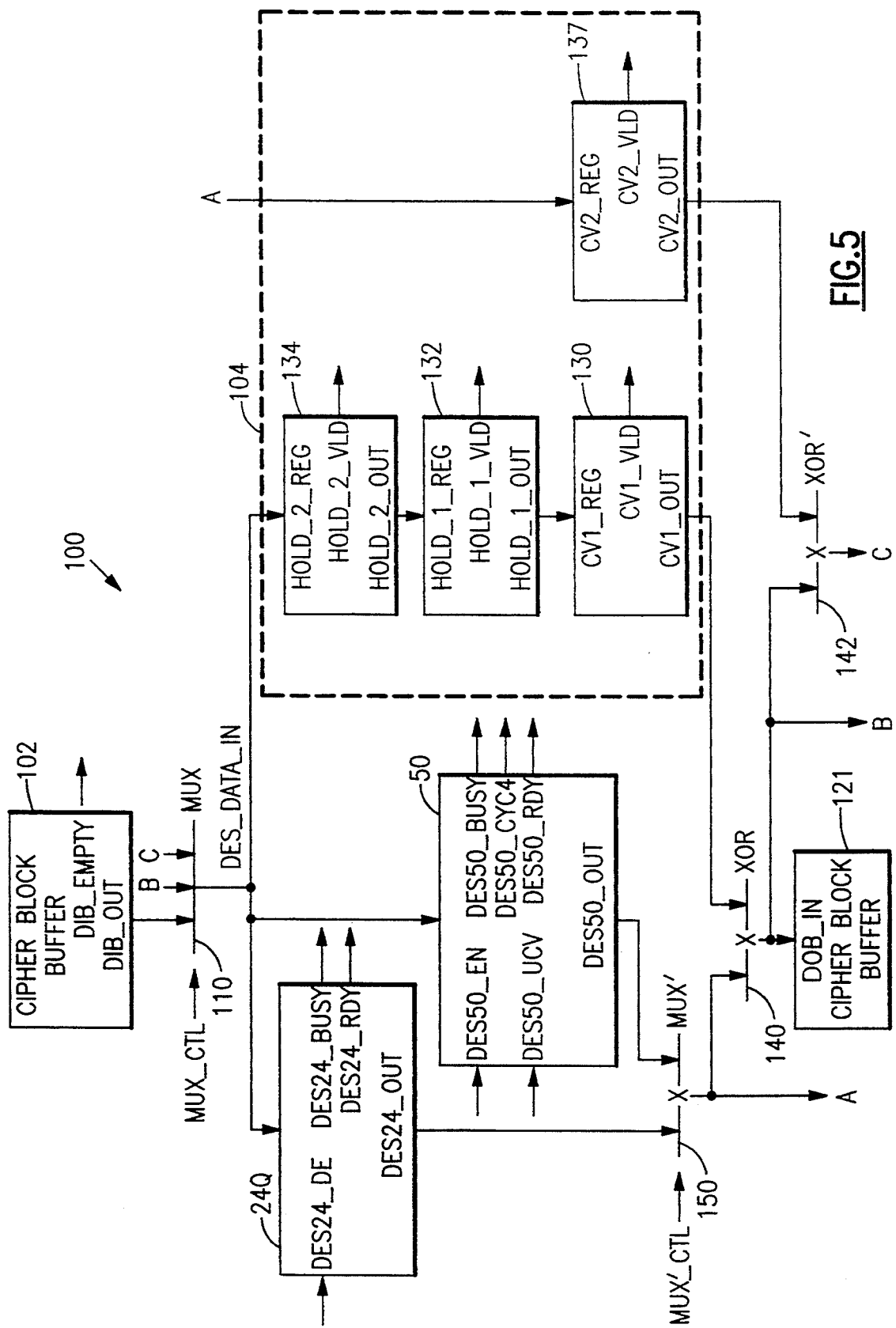
FIG. 5 is a more detailed diagram of the hardware of FIG. 3.
Figure 6:
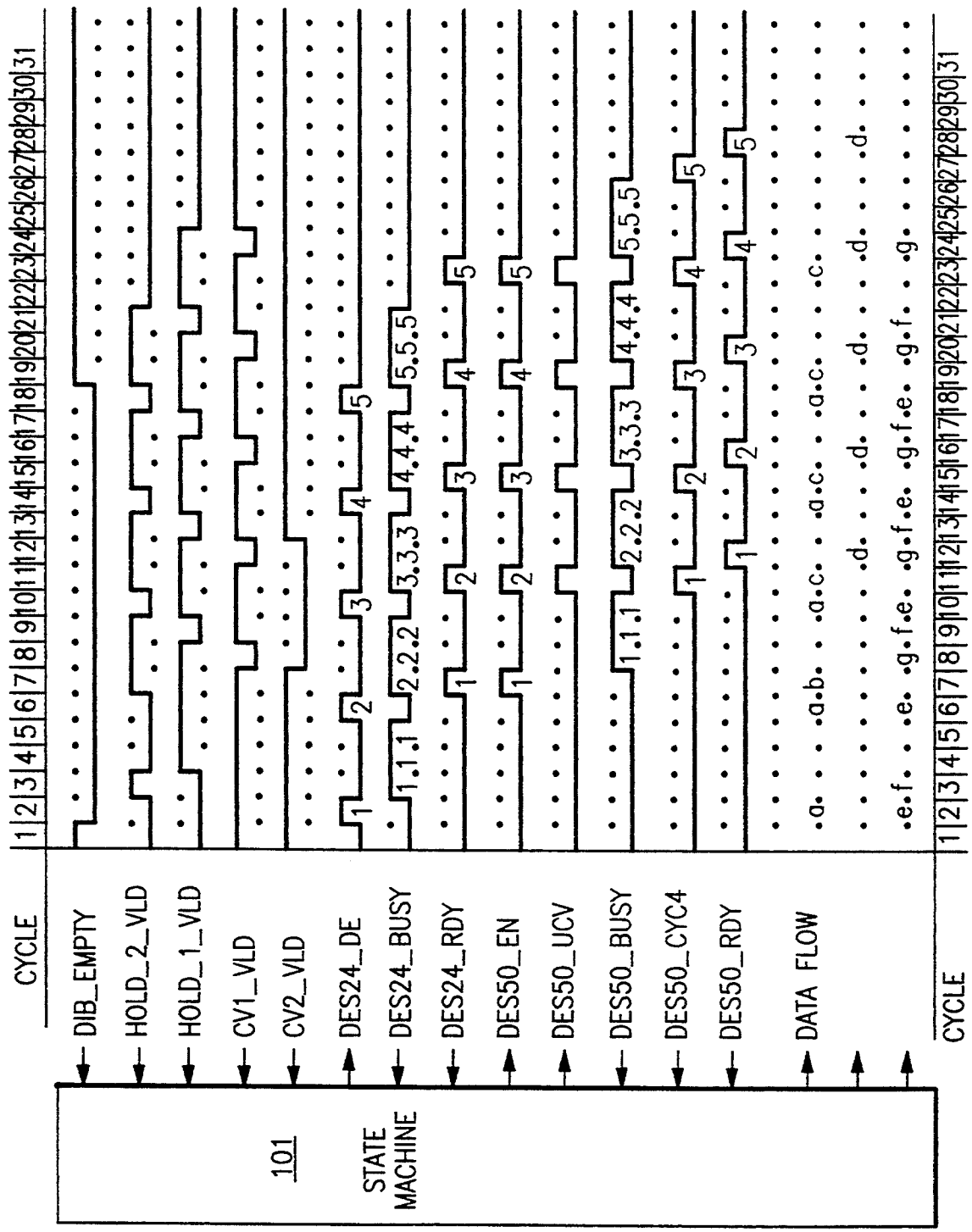
FIG. 6 is a detailed timing diagram illustrating the timing of functions within the hardware of FIG. 5.

FIG. 5 illustrates the operative components of system 100 in more detail, except for the actual decryption unit 24q and encryption unit 50 which are illustrated in detail in two alternate embodiments in FIGS. 10 and 11 and described below. FIG. 6 is a detailed timing diagram for timing control of the operative components of system 100 illustrated in FIG. 5. A state machine or other timing hardware 101 provides such timing signals. It is a straight forward matter to provide such a state machine or other timing hardware that provides the timing signals of FIG. 6, so such state machine or other timing hardware need not be described further. FIG. 5 illustrates that CV buffer 104 is three stage, and includes registers 130, 132 and 134 to store the input cipher blocks x−1, x and x+1, respectively when decryption unit 24q processes cipher block x. The contents of registers 130, 132 and 134 are all used for the decryption process. In the foregoing example, when decryption unit 24q processes cipher block x, the intermediate value is the x−1 cipher block which is stored in register 130. Except during start up, the intermediate values are loaded into the first stage register 134 and then propagated sequentially to the second stage register 132 and the third stage register 130 during each successive load operation illustrated in the first row of FIG. 4. The contents of third stage register 130 are available for the exclusive OR unit 106 and exclusive OR unit 112. The inclusion of the three stages permits loading of the register 134 with the x+1 cipher block while the exclusive OR operation is performed using the x−1 cipher block as an intermediate value.

Before receipt of the first cipher block, the initialization value 14' is loaded into register 130 (the third stage) for the first decryption operation. The first cipher block which forms the next intermediate value is also loaded into the first stage register 134 but because the second stage register 132 is currently empty, the first cipher block is quickly shifted to the second stage register 132 (to fill the gap) during decryption of the first cipher block. Each subsequent cipher block is loaded into the first stage register 134, when received. The initialization value 114 for the encryption operation and subsequent encrypted results from encryption unit 50 are loaded into a register 137.

FIG. 5 also illustrates the composition of exclusive OR units 106 and 112. As noted above, exclusive OR unit 112 is single stage and comprises a single set 140 of exclusive OR gates. Exclusive OR unit 106 is two stage and comprises the set 140 of exclusive OR gates in series with a second set 142 of exclusive OR gates. The components illustrated in FIG. 5 also include internal control circuitry defined as follows:

Input Cipher Block Buffer Controls
DIB_EMPTY signal, when active, indicates that the input cipher block buffer 102 contains no valid data and vice versa. Valid data in buffer 102 is a prerequisite for decryption.

DES Decryption Unit 24q and Encryption Unit 50 Controls
DES24_DE signal, when active, indicates that decryption unit 24q should initiate a decryption operation on its current input cipher block from buffer 102 via multiplexor 110.
DES50_EN signal, when active, indicates that encryption unit 50 should initiate an encryption operation on its current input block from multiplexor 110.
DES50_UCV signal, when active, causes the next output from encryption unit 50 to be exclusive ORed with its current input block. This signal activates multiplexor 118 to gate the output of exclusive OR unit 116 as the next data block to be encrypted (See FIG. 3).
DES24_BUSY signal, when active, indicates that decryption unit 24q is busy performing a decryption operation for a cipher block and is not available yet to begin decryption of the next cipher block. A prerequisite for performing a decryption using decryption unit 24 is for this signal to be inactive.

DES50_CYC4 signal, when active, indicates that encryption unit 50 will have valid data available at the next clock cycle. A prerequisite for gating exclusive OR unit 140 via mutiplexor 110 as input for the next encryption unit 50 operation, and for activating the DES50_UCV control signal is for this signal to be active. A prerequisite for gating exclusive OR unit 142 via multiplexor 110 as input for the next encryption unit 50 operation is for this signal to be inactive.

DES24_RDY signal, when active, indicates that decryption unit 24q has completed its processing and has a valid result at its output. A prerequisite for initiating encryption unit 50 operation, gating the appropriate exclusive OR unit 140 or 142 via multiplexor 110 as input for the next encryption unit 50 operation and activating the DES50_UCV control signal is for this signal to be active. Also, a prerequisite for initiating a decryption unit 24 operation is for this signal to be inactive.

DES50_RDY signal, when active, indicates that encryption unit 50 has completed its processing and has a valid result at its output. This signal causes a cipher block to be written from the output of encryption unit 50 into the cipher block buffer 121 and register 137.

DES50_BUSY signal, when active, indicates that encryption unit 50 is busy performing an encryption operation for a data block and is not available yet to begin encryption of the next data block. One of two prerequisites for initiating a decryption unit 24 operation is for this control signal to be active.

(The alternate prerequisite for initiating a decryption unit 24 operation is for the CV2_VLD control signal to be active.)

CV Buffer 104 Controls

HOLD_i_VLD, when active, indicates that register i (132 or 134) has completed latching of input data.

CV_i_VLD, when active, indicates that register i (130 or 137) has completed latching of input data. The following rules govern movement of data within CV buffer 104:

HOLD_2_REG is loaded with input buffer data and enters the valid state whenever a decryption operation is initiated on decryption unit 24q.

HOLD_1_REG is loaded with HOLD_2_REG data if HOLD_1_VLD is inactive and HOLD_2_VLD is active. This causes HOLD_1_VLD to activate, and HOLD_2_VLD to go inactive.

CV1_REG is loaded with HOLD 1REG data if CV1_VLD is inactive and HOLD_1_VLD is active. This causes CV1_VLD to activate, and HOLD_1_VLD to go inactive.

CV1_REG data is used whenever a decryption operation completes on decryption unit 24q. This causes CV1_VLD to go inactive.

CV2_REG is loaded whenever a result is available from encryption unit 50. This causes CV2_VLD to activate. CV2_REG data is used whenever a decryption operation completes on decryption unit 24q and exclusive OR unit 142 is gated via multiplexor 110 as input for the next encryption unit 50 operation. This causes CV2_VLD to go inactive.

The following Chart describes these control signals and the timing diagram of FIG. 6 in more detail:

| Action | Decryption Unit 24 Encryption Unit 50 Control Condition | Description |
| --- | --- | --- |
| Start DES 24 Decipher(a)*/ Load HOLD_2_REG(e)*/ Set HOLD_2_VLD | CV1_VLD AND (CV2_VLD OR DES50_BUSY) AND | Decipher Chain Value loaded. Encipher Chain Value loaded or may be XORd internally by DES 50. |
|  | NOT HOLD_2_VLD AND | Denotes empty position in Chain Value Buffer which is available to hold next Decipher Chain Value. |
|  | NOT DES24_BUSY AND | DES 24 is available to perform a Decipher operation. |
|  | NOT DES24_RDY AND | If active, do not start the next DES 24 Decipher because the corresponding DES 50 Encipher Chain Value will not be available in CV2_REG for input to the 3-Way XOR which will be input for the next DES 50 Encipher. |
|  | NOT DIB_EMPTY | Input buffer contains valid data. |
| Start DES50 Encipher Input 3_Way XOR to DES50(b)*/ Reset CV2_VLD and CV1_VLD | DES24_RDY DES24_RDY AND | DES 24 result is available. DES 24 Decipher result is available. |
|  | NOT DES50_CYC4 | DES50 can not supply Encipher Chain Value internally. |
| Input 2-Way XOR to DES50(c)*/ | DES24_RDY AND | DES 24 Decipher result is available. |

-continued

| Action | Decryption Unit 24 Encryption Unit 50 Control Condition | Description |
|---|---|---|
| Activate DES50_UCV to use DES50 internal XOR/ Reset CV1_VLD | DES50_CYC4 | DES50 can supply Encipher Chain Value internally. |
| Load Data Output Buffer and CV2_REG(d)* with DES 50 Result/ Set CV2_VLD | DES50_RDY | DES 50 Encipher result is available. |
| Load HOLD_1_REG(f)* /Reset HOLD2_VLD/ Set HOLD_1_VLD | HOLD_2_VLD AND | Contents of HOLD_2_REG are valid. |
| | NOT HOLD_1_VLD | Contents of HOLD_1_REG are invalid. |
| Load CV1_REG(g)*/ Reset HOLD_1_VLD/ Set CV1_VLD | HOLD_1_VLD AND | Contents of HOLD_1_REG are valid. |
| | NOT CV1_VLD | Contents of CV1_REG are invalid. |

*Letters in ( ) refer directly to the corresponding data flow actions specified in FIG. 6.

PRIOR ART ENCRYPTION UNIT

Figure 7:
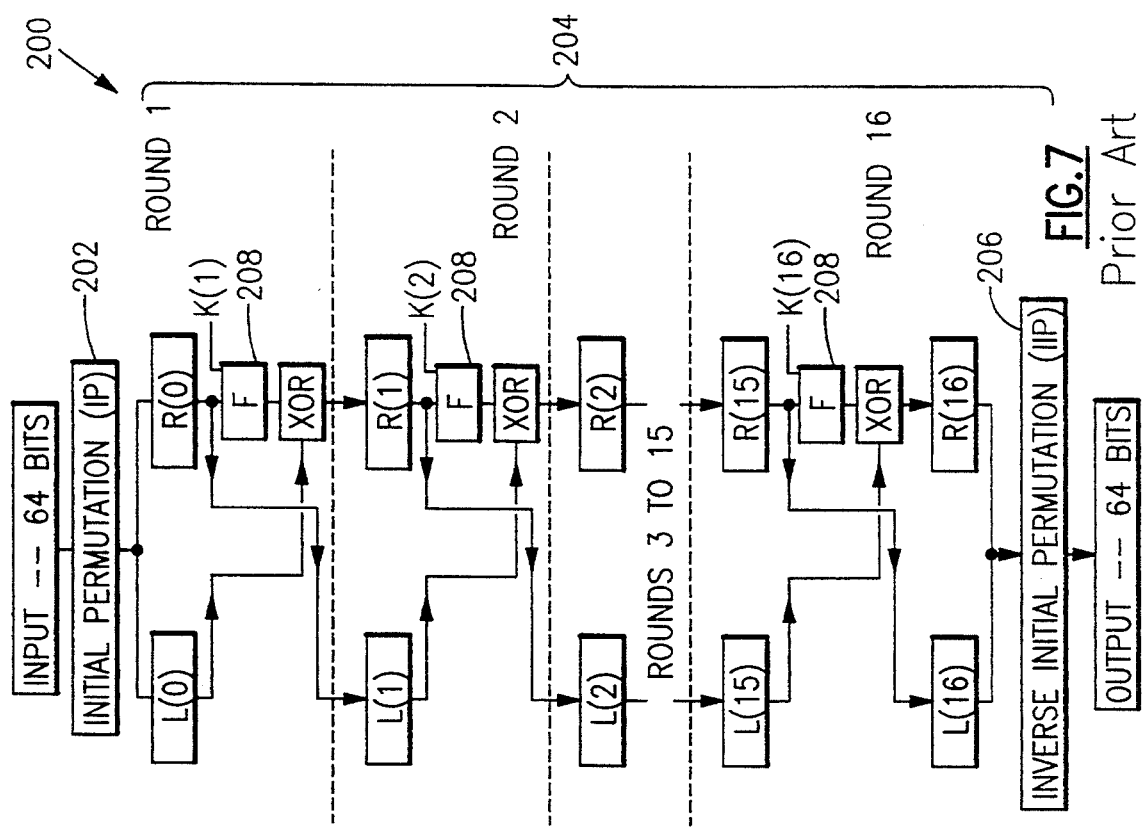
FIG. 7 is a block diagram of a prior art DES encryption/decryption unit that can be used for a decryption unit within the hardware of FIG. 3.

FIG. 7 illustrates a DES unit 200 according to the prior art ANSI standard X 3.92-1981 that can perform both encryption and decryption. Decryption unit 24q can be the same as prior art decryption unit 200. The DES algorithm performed by DES unit 200 comprises a 64-bit initial permutation 202, sixteen "rounds" 204 of data involution, and finally a 64-bit inverse initial permutation 206. Logical time delay caused by the permutations is minimal, while the sixteen back to back "rounds" of data involution are relatively time consuming. In each round, the right half of data is input into a function "f" (208), and the left half undergoes a bit by bit exclusive OR (XOR) with the output of function f. In rounds 1-16, the other input of function f is a 48 bit partial key, which is generated from the 64 bit key 15b. Outputs L(16) and R(16) are concatenated and subjected to inverse initial permutation for final DES 64 bit output.

Table 1 defines the initial permutation function 202. The permuted input has bit 58 of the input as its first bit, bit 50 as its second bit, and so on with bit 7 as its last bit.

Figure 8:
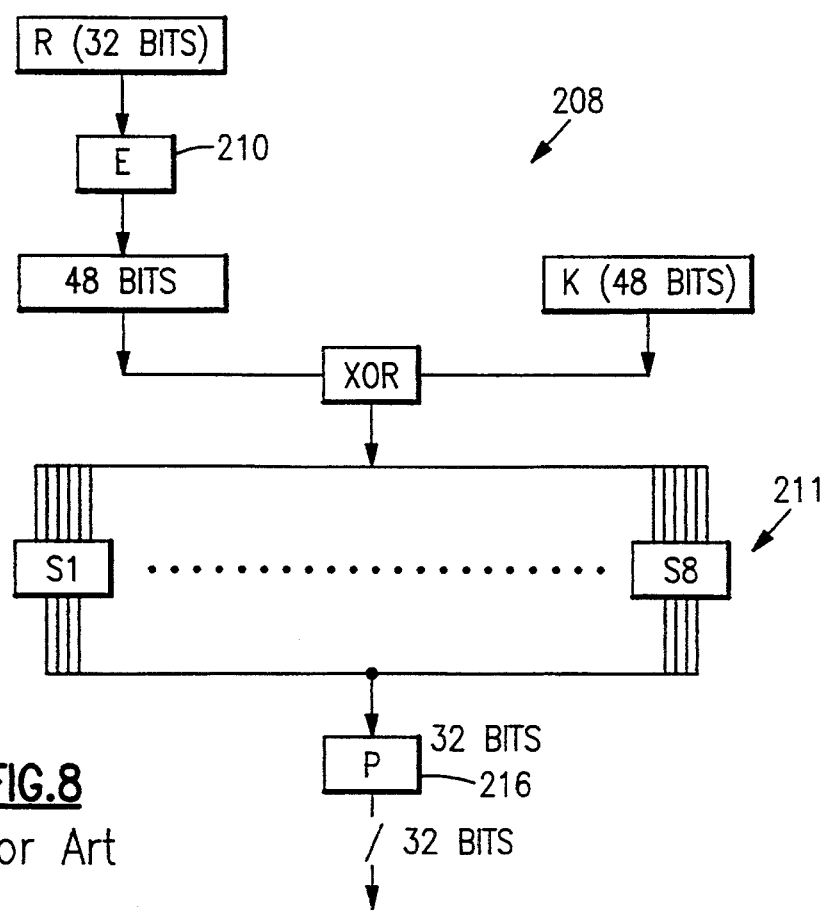
FIG. 8 is a block diagram of a prior art "f" function within the DES unit of FIG. 7.

FIG. 8 illustrates function f (208). "E" function 210 denotes expansion which takes a block of 32 bits as inputs and yields a block of 48 bits as output, using an E bit selection table as shown in the Table 2. Let E be such that the 48 bits of its output, written as 8 blocks of 6 bits each, are obtained by selecting the bits in its inputs in order according to Table 2. Thus, the first three bits of E(r) are the bits in positions 32, 1 and 2 of R while the last 2 bits of E(R) are the bits in positions 32 and 1.

The function f also uses selection functions S1, S2, . . . S8 (illustrated in FIG. 8) each of which takes a 6-bit block as input and yields a 4-bit block as output. According to Table 3, if S1 is the function defined in the table and B is a block of 6 bits, then Si(B) is determined as follows. The first and last bits of B represent in base 2 a number in the range 0-3. Let that number be i. The middle 4 bits of B represent in base 2 a number in the range 0-15. Let that number be j. Look up in the table the number in the i'th row and the j'th column. It is a number in the range 0-15 and is uniquely represented by a 4-bit block. That block is the output S1 for the input B. For example, for input 011011 the row is 01, that is row 1, and the column is determined by 1101, that is column 13. In row 1 column 13 appears 5 so that the output is 0101. Thus, the first three bits of E(R) are the bits in position 32, 1 and 2 while the last bits in positions 32 and 1. Selection function S1, . . . S8 of FIG. 8 are also known as S-boxes (look-up-tables). The 6 bits of each S1-S8 functions are viewed as an index into one of the eight S-boxes. An S-box provides 64 entries of 4 bits each, so the results of all eight look-up operations will yield a 32 bit output block.

Table 4 illustrates permutation function P (216). The outputs for the function P are chosen from the inputs using this table. Thus, function P input bits 16, 7, 20 . . . 4, 25 are permuted as output bits 1, 2, 3, . . . 31, and 32.

Figure 9:
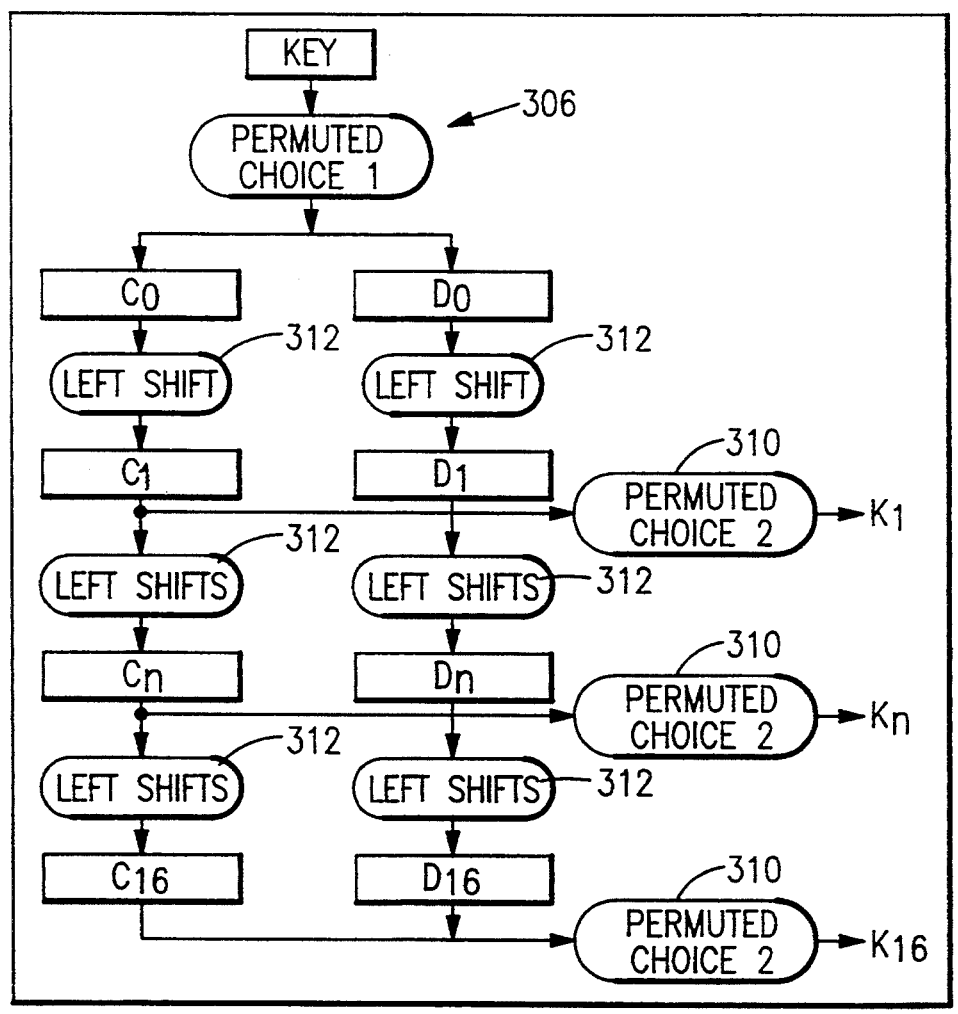
FIG. 9 is a block diagram of a prior art function which generates Ki values for the DES unit of FIG. 7.

The DES function illustrated in FIG. 7 also requires that each round has as inputs to its function f 208 an iteration of the original input key. Each K(1) through K(16) is derived by means of the method shown in FIG. 9. The function of FIG. 9 requires first a permutation of the input key as defined by permuted choice-1 (PC-1) 306 of table 6. This table determines C0 and D0 values. The bits of Co are bits 57, 49, 41, . . . 44 and 36 of the input key, respectively and the bits of D0 are the bits 63, 55, 37, . . . 12 and 4 of the input key, respectively. Next, C1-C16 and D1-D16 are determined by left shifts 312 indicated by Table 7. For example, C3 and D3 are determined from C2 and D2, respectively, by two left shifts, and C16 and D16 are determined from C15 and D15, respectively, by one left shift. Next, K1-K16 are determined from C1-C16 and D1-D16, respectively by concatenating the two 28 bit wide values C(n) and D(n) together and then permutating this 56 bit value as defined by permuted choice-2 (PC-2) 310 as indicated in Table 8. For example, the first bit of Kn is the 14th bit of the 56 bit value, the second bit of K(n) is the 14th is the 17th bit of this 56 bit value, the 47th bit of K(n) is the 29th bit of the 56 bit value.

Table 9 illustrates the inverse initial permutation function 206. The output of function 206 has bit 40 of the preoutput block as its first bit, bit 8 as its second bit, and so on, until bit 25 of the pre-output block is the last bit of the output.

MODIFIED DECRYPTION/ENCRYPTION UNIT

Figure 10:
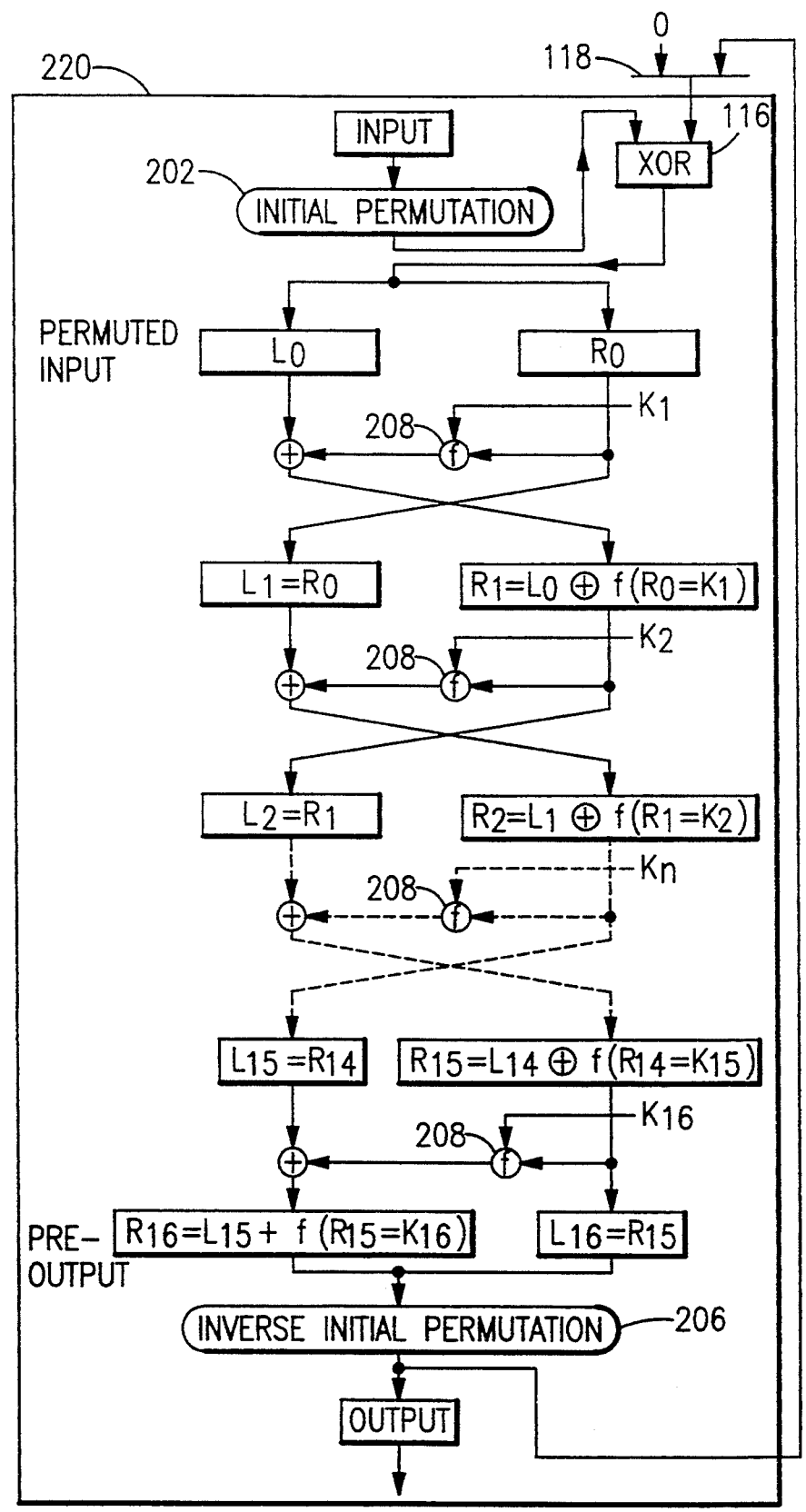
FIG. 10 is a block diagram of a DES unit which has been modified for inclusion within the translation hardware of FIGS. 3 and 5.

FIG. 10 illustrates a modified decryption/encryption unit 220 that can be used for both decryption unit 24q and encryption unit 50 in system 100. The modification includes internal exclusive OR unit 116 and multiplexor 118 (illustrated also in FIG. 3) and a feedback from the output of the decryption/encryption unit to the multiplexor 118. The exclusive OR unit 116 is located between the initial permutation unit and the bus leading to L0 and R0 and therefore operates upon all blocks processed by the decryption/encryption unit. However, the multiplexor 118 determines whether to perform the exclusive OR function with 0000 or the latent output of the decryption/encryption unit. Thus, for use as decryption unit 24q, the multiplexor 118 always selects 0000 to be exclusive ORed with the output of the initial permutation unit so the exclusive OR unit 116 does not change the data and has no logical effect. (This modification is provided only for standardization between the decryption unit and encryption unit.) However, for the encryption unit 50, the multiplexor selects 0000 for the first block and selects the previous output of the encryption unit for all subsequent blocks except when the intermediate values must be obtained from buffer 104 as described above.

FIG. 11 illustrates the second and preferred embodiment 300 of DES units 24q and 50. This embodiment is faster than embodiment 220 of FIG. 10. The initial permutation unit 202, inverse initial permutation unit 206, expansion 210, S-Box (or S function) 211 and permutation 216 are as defined in the prior art decryption/encryption unit 200 described above. DES unit 300 performs exactly four DES rounds of data manipulation per clock period. Various registers hold intermediate round results while new round results are being generated in between subsequent clock periods. Data is returned to the input of the implementation through the multiplexor 118. To comply with the required sixteen rounds of data manipulation specified by the DES, four clock periods must occur in this embodiment to yield the correct result. The left side of FIG. 11 provides a key scheduling function and the right side of FIG. 11 provides a data encryption or decryption function.

The key scheduling function is identical to the prior art system 200 and ANSI X3.92-1981 standard. A 64 bit user key is provided at the KEY_DATA_IN bus, permuted according to PC-1 306 as described in Table 6, then bit shifted 312 according to Table 7. Immediately after the shifting, this data is passed to the next bit shifter 312 which will be used to generate the key for the next round. It is also passed to PC-2 310 to be permuted again according to Table 8. This output is the first 48 bit key K1 which is stored in KIN_REG1 for use in the first round of the encryption or decryption function. The second through fourth round key are generated in this manner also, all in one clock period. KIN_REG4 is returned to the input of the implementation for subsequent clock periods. During these subsequent clock periods, the fifth through sixteenth round keys will be generated.

The encryption or decryption function begins when a 64 bit user data value is provided at the DES_DATA_IN bus, permuted 202 according to Table 1, split into two 32 bit halves, passed through new data or subsequent data selection multiplexors (119-1 and 119-2) and then stored in two registers, DIN_REGL0 and DIN_REGR0. Through the use of a multiplexor 118, these values are then XORed (116-1, 116-2) with 0000 or the latent output fed back from HLD_REG 304. When used as decryption unit 24q, the 0000 input to multiplexor 118 is always selected. When used as encryption unit 50, the 0000 input to multiplexor 118 is selected for the first data block and the latent output fed back from HLD_REG 304 is selected for subsequent data blocks (except when the intermediate value must be obtained from buffer 104 as described above). Next, the right half is expanded 210 to 48 bits according to Table 2, XORed with the first 48 bit key K1 and then fed to an SBOX 211 that provides selected patterns of 32 bits according to Table 3. These 32 bits are then permuted 216 according to Table 4 and then XORed with the left half of the input data stored in DIN_REGL0. At the start of the next stage, again the data is expanded to 48 bits 210 according to Table 2 and so on. The process continues until the data has been manipulated for exactly three more DES rounds. After the data has passed completely through the four rounds of logic, it is returned to the top of the design at the new data or subsequent data multiplexors (119-1 and 119-2) to be stored in the DIN_REGL0 and DIN_REGR0 for the next clock period. For the DES required sixteen rounds, this process will occur for four periods, after which the result is sent to inverse initial permute function 206 described by Table 9, as well as the chain value hold register 304. From the permute, the final result is then loaded into the DES_OUT_REG. With the exception of internal multiplexor 118 and the 0000 input therefore, hold register 304 and exclusive OR units 116-1 and 116-2, DES unit 300 is the same as in U.S. patent application Ser. No. 07/916,777, filed by C. Y. Kao et al., on Jul. 17, 1992, which patent application is hereby incorporated by reference as part of the present disclosure.

TABLE 1

Initial Permutation (IP)

| 58 | 50 | 42 | 34 | 26 | 18 | 10 | 2 |
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9  | 1 |
| 59 | 51 | 43 | 35 | 27 | 19 | 11 | 3 |
| 61 | 53 | 45 | 37 | 29 | 21 | 13 | 5 |
| 63 | 55 | 47 | 39 | 31 | 23 | 15 | 7 |

TABLE 2

E Bit-Selection.

| 32 | 1  | 2  | 3  | 4  | 5  |
| 4  | 5  | 6  | 7  | 8  | 9  |
| 8  | 9  | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1  |

TABLE 3

Primitive Functions. ($S_1, S_2, \ldots S_8$)

$S_1$

| 14 | 4 | 13 | 1 | 2 | 15 | 11 | 8 | 3 | 10 | 6 | 12 | 5 | 9 | 0 | 7 |

TABLE 3-continued

Primitive Functions. ($S_1, S_2, \ldots S_8$)

| 0 | 15 | 7 | 4 | 14 | 2 | 13 | 1 | 10 | 6 | 12 | 11 | 9 | 5 | 3 | 8 |
|---|---|---|---|---|---|---|---|---|---|---|---|---|---|---|---|
| 4 | 1 | 14 | 8 | 13 | 6 | 2 | 11 | 15 | 12 | 9 | 7 | 3 | 10 | 5 | 0 |
| 15 | 12 | 8 | 2 | 4 | 9 | 1 | 7 | 5 | 11 | 3 | 14 | 10 | 0 | 6 | 13 |

$S_2$

| 15 | 1 | 8 | 14 | 6 | 11 | 3 | 4 | 9 | 7 | 2 | 13 | 12 | 0 | 5 | 10 |
|---|---|---|---|---|---|---|---|---|---|---|---|---|---|---|---|
| 3 | 13 | 4 | 7 | 15 | 2 | 8 | 14 | 12 | 0 | 1 | 10 | 6 | 9 | 11 | 5 |
| 0 | 14 | 7 | 11 | 10 | 4 | 13 | 1 | 5 | 8 | 12 | 6 | 9 | 3 | 2 | 15 |
| 13 | 8 | 10 | 1 | 3 | 15 | 4 | 2 | 11 | 6 | 7 | 12 | 0 | 5 | 14 | 9 |

$S_3$

| 10 | 0 | 9 | 14 | 6 | 3 | 15 | 5 | 1 | 13 | 12 | 7 | 11 | 4 | 2 | 8 |
|---|---|---|---|---|---|---|---|---|---|---|---|---|---|---|---|
| 13 | 7 | 0 | 9 | 3 | 4 | 6 | 10 | 2 | 8 | 5 | 14 | 12 | 11 | 15 | 1 |
| 13 | 6 | 4 | 9 | 8 | 15 | 3 | 0 | 11 | 1 | 2 | 12 | 5 | 10 | 14 | 7 |
| 1 | 10 | 13 | 0 | 6 | 9 | 8 | 7 | 4 | 15 | 14 | 3 | 11 | 5 | 2 | 12 |

$S_4$

| 7 | 13 | 14 | 3 | 0 | 6 | 9 | 10 | 1 | 2 | 8 | 5 | 11 | 12 | 4 | 15 |
|---|---|---|---|---|---|---|---|---|---|---|---|---|---|---|---|
| 13 | 8 | 11 | 5 | 6 | 15 | 0 | 3 | 4 | 7 | 2 | 12 | 1 | 10 | 14 | 9 |
| 10 | 6 | 9 | 0 | 12 | 11 | 7 | 13 | 15 | 1 | 3 | 14 | 5 | 2 | 8 | 4 |
| 3 | 15 | 0 | 6 | 10 | 1 | 13 | 8 | 9 | 4 | 5 | 11 | 12 | 7 | 2 | 14 |

$S_5$

| 2 | 12 | 4 | 1 | 7 | 10 | 11 | 6 | 8 | 5 | 3 | 15 | 13 | 0 | 14 | 9 |
|---|---|---|---|---|---|---|---|---|---|---|---|---|---|---|---|
| 14 | 11 | 2 | 12 | 4 | 7 | 13 | 1 | 5 | 0 | 15 | 10 | 3 | 9 | 8 | 6 |
| 4 | 2 | 1 | 11 | 10 | 13 | 7 | 8 | 15 | 9 | 12 | 5 | 6 | 3 | 0 | 14 |
| 11 | 8 | 12 | 7 | 1 | 14 | 2 | 13 | 6 | 15 | 0 | 9 | 10 | 4 | 5 | 3 |

$S_6$

| 12 | 1 | 10 | 15 | 9 | 2 | 6 | 8 | 0 | 13 | 3 | 4 | 14 | 7 | 5 | 11 |
|---|---|---|---|---|---|---|---|---|---|---|---|---|---|---|---|
| 10 | 15 | 4 | 2 | 7 | 12 | 9 | 5 | 6 | 1 | 13 | 14 | 0 | 11 | 3 | 8 |
| 9 | 14 | 15 | 5 | 2 | 8 | 12 | 3 | 7 | 0 | 4 | 10 | 1 | 13 | 11 | 6 |
| 4 | 3 | 2 | 12 | 9 | 5 | 15 | 10 | 11 | 14 | 1 | 7 | 6 | 0 | 8 | 13 |

$S_7$

| 4 | 11 | 2 | 14 | 15 | 0 | 8 | 13 | 3 | 12 | 9 | 7 | 5 | 10 | 6 | 1 |
|---|---|---|---|---|---|---|---|---|---|---|---|---|---|---|---|
| 13 | 0 | 11 | 7 | 4 | 9 | 1 | 10 | 14 | 3 | 5 | 12 | 2 | 15 | 8 | 6 |
| 1 | 4 | 11 | 13 | 12 | 3 | 7 | 14 | 10 | 15 | 6 | 8 | 0 | 5 | 9 | 2 |
| 6 | 11 | 13 | 8 | 1 | 4 | 10 | 7 | 9 | 5 | 0 | 15 | 14 | 2 | 3 | 12 |

$S_8$

| 13 | 2 | 8 | 4 | 6 | 15 | 11 | 1 | 10 | 9 | 3 | 14 | 5 | 0 | 12 | 7 |
|---|---|---|---|---|---|---|---|---|---|---|---|---|---|---|---|
| 1 | 15 | 13 | 8 | 10 | 3 | 7 | 4 | 12 | 5 | 6 | 11 | 0 | 14 | 9 | 2 |
| 7 | 11 | 4 | 1 | 9 | 12 | 14 | 2 | 0 | 6 | 10 | 13 | 15 | 3 | 5 | 8 |
| 2 | 1 | 14 | 7 | 4 | 10 | 8 | 13 | 15 | 12 | 9 | 0 | 3 | 5 | 6 | 11 |

TABLE 4

Permutation Function (P)

| 16 | 7 | 20 | 21 |
|---|---|---|---|
| 29 | 12 | 28 | 17 |
| 1 | 15 | 23 | 26 |
| 5 | 18 | 31 | 10 |
| 2 | 8 | 24 | 14 |
| 32 | 27 | 3 | 9 |
| 19 | 13 | 30 | 6 |
| 22 | 11 | 4 | 25 |

TABLE 5

Inverse Initial Permutation. ($IP^{-1}$)

| 40 | 8 | 48 | 16 | 56 | 24 | 64 | 32 |
|---|---|---|---|---|---|---|---|
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9 | 49 | 17 | 57 | 25 |

TABLE 6

Permuted Choice 1 (PC-1)

Ce

| 57 | 49 | 41 | 33 | 25 | 17 | 9 |
|---|---|---|---|---|---|---|
| 1 | 58 | 50 | 42 | 34 | 26 | 18 |
| 10 | 2 | 59 | 51 | 43 | 35 | 27 |
| 19 | 11 | 3 | 60 | 52 | 44 | 36 |

De

| 63 | 55 | 47 | 39 | 31 | 23 | 15 |
|---|---|---|---|---|---|---|
| 7 | 62 | 54 | 46 | 38 | 30 | 22 |

TABLE 6-continued

Permuted Choice 1 (PC-1)

| 14 | 6 | 61 | 53 | 45 | 37 | 29 |
|---|---|---|---|---|---|---|
| 21 | 13 | 5 | 28 | 20 | 12 | 4 |

TABLE 7

Shift Schedule

| Iteration Number | Number of Left Shifts |
|---|---|
| 1 | 1 |
| 2 | 1 |
| 3 | 2 |
| 4 | 2 |
| 5 | 2 |
| 6 | 2 |
| 7 | 2 |
| 8 | 2 |
| 9 | 1 |
| 10 | 2 |
| 11 | 2 |
| 12 | 2 |
| 13 | 2 |
| 14 | 2 |
| 15 | 2 |
| 16 | 1 |

TABLE 8

Permuted Choice 2 (PC-2)

| 14 | 17 | 11 | 24 | 1 | 5 |
|---|---|---|---|---|---|
| 3 | 28 | 15 | 6 | 21 | 10 |
| 23 | 19 | 12 | 4 | 26 | 8 |
| 16 | 7 | 27 | 20 | 13 | 2 |
| 41 | 52 | 31 | 37 | 47 | 55 |

TABLE 8-continued

| Permuted Choice 2 (PC-2) | | | | | |
|---|---|---|---|---|---|
| 30 | 40 | 51 | 45 | 33 | 48 |
| 44 | 49 | 39 | 56 | 34 | 53 |
| 46 | 42 | 50 | 36 | 29 | 32 |

TABLE 9

| Inverse Initial Permutation. ($IP^{-1}$) | | | | | | | |
|---|---|---|---|---|---|---|---|
| 40 | 8 | 48 | 16 | 56 | 24 | 64 | 32 |
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9 | 49 | 17 | 57 | 25 |

Based on the foregoing, translation systems according to the present invention have been disclosed. However, numerous modifications and substitutions can be made without deviating from the scope of the present invention. Therefore, the invention has been disclosed by way of illustration and not limitation, and reference should be made to the following claims to determine the scope of the present invention.

We claim:

1. A system for translating a first group of cipher blocks based on a first encryption key to a second group of respective cipher blocks based on a second encryption key, said system comprising:
   decryption means for sequentially decrypting said cipher blocks of said first group;
   encryption means, coupled to receive decrypted blocks output from said decryption means, for sequentially encrypting said decrypted blocks into respective cipher blocks of said second group based on said second encryption key; and
   control means for controlling said encryption means to encrypt each of a multiplicity of successive blocks substantially in parallel with said decryption means decrypting a next block.

2. A system as set forth in claim 1 wherein
   said decryption means comprises a decryption unit coupled to receive said first group of cipher blocks, first means for exclusive ORing an output of said decryption unit with a previous cipher block of said first group and a second buffer coupled to receive said cipher blocks of said first group and supply said previous cipher block of said first group to said first means; and
   said encryption means comprises an encryption unit, second means for exclusive ORing an output of said decryption unit with a previous cipher block of said first group and a previous cipher block of said second group, and a first buffer, interposed between an output of said encryption unit and said second means, for storing said previous cipher block of said second group from said encryption unit.

3. A system as set forth in claim 1 wherein
   said decryption means comprises a decryption unit and means for exclusive ORing an output of said decryption unit with a previous cipher block of said first group; and
   said control means operates the exclusive ORing means for each of said blocks simultaneously with the decryption unit for a next one of said blocks in said first group.

4. A system as set forth in claim 3 wherein said control means operates said encryption means for each of said blocks after said each block has been exclusive ORed with said previous cipher block of said first group by said exclusive ORing means.

5. A system as set forth in claim 1 wherein
   said encryption means comprises an encryption unit and means for exclusive ORing a block output from said decryption unit with a previous cipher block of said second group to yield an input for said encryption unit; and
   said control means operates the exclusive ORing means for each of said blocks simultaneously with the encryption unit for a previous one of said blocks.

6. A system for translating a first group of cipher blocks based on a first encryption key into a second group of respective cipher blocks based on a second encryption key, said system comprising:
   a decryption unit coupled to receive said cipher blocks of said first group in a sequence;
   first means for exclusive ORing an output of said decryption unit with a previous cipher block of said first group;
   second means for exclusive ORing an output of said first means with a previous cipher block of said second group without intermediate buffering;
   an encryption unit;
   a buffer coupled to an output of said encryption unit for storing a previous cipher block of said second group, and third means for exclusive ORing an output of said decryption unit with a previous cipher block of said first group and the previous cipher block of said second group from said buffer; and wherein
   said encryption unit is coupled to receive in said sequence some blocks output from said second means and other blocks output from said third means to encrypt into said second group based on said second key.

7. A system as set forth in claim 6 further comprising means for selecting said first and second means for exclusive ORing instead of said third means for exclusive ORing when said previous cipher block of said second group is available for said second means for exclusive ORing.

8. A system as set forth in claim 6 further comprising means for selecting said third means for exclusive ORing instead of said first and second means for exclusive ORing when said previous cipher block of said second group is not available for said second means for exclusive ORing.

9. A system as set forth in claim 6 further comprising control means for controlling said encryption unit to encrypt each of a multiplicity of successive blocks while said decryption unit decrypts substantially in parallel a next block.

10. A system as set forth in claim 6 wherein said third means is operable when said previous cipher block of said second group is not available from the output of said encryption unit when a current block is output from said first means.

11. A system for translating a first group of cipher blocks based on a first encryption key into a second group of respective cipher blocks based on a second encryption key, said system comprising:

a decryption unit based on said first key and coupled to receive said cipher blocks of said first group in a sequence;

means for exclusive ORing an output of said decryption unit with a previous cipher block of said first group with a previous cipher block of said second group; and an encryption unit based on said second key and coupled to receive blocks output from the exclusive OR means in said sequence to yield said cipher blocks of said second group; and wherein said decryption unit processes during a time T to T+D an X+1 cipher block of said first group, said exclusive OR means exclusive ORs during time T to T+E (where E is less than T) an X block output from said decryption unit with an X−1 cipher block of said first group with an X−1 cipher block of said second group to yield an output, and said encryption unit processes during time T+E to T+D+E the exclusive OR means output.

12. A system as set forth in claim 11 wherein said decryption unit is loaded during time T+D−E to T+D with an X+2 cipher block of said first group.

13. A system as set forth in claim 12 further comprising a buffer coupled to receive said cipher blocks of said first group and supply them to said exclusive OR means, and wherein said buffer is loaded during a time T−E to time T with the X+1 cipher block of said first group.

14. A system as set forth in claim 12 further comprising a buffer interposed between an output of said encryption unit and said exclusive OR means to receive said cipher blocks of said second group and wherein said buffer is loaded during time T+D+E to time T+D+2E with cipher block X of said second group.

15. A system as set forth in claim 14 further comprising a second buffer coupled to receive said cipher blocks of said first group and supply them to said exclusive OR means, and wherein said second buffer is loaded during a time T−E to time T with an X+1 cipher block of said first group.

16. A system for translating a first group of cipher blocks based on a first encryption key into a second group of respective cipher blocks based on a second encryption key, said system comprising:

a decryption unit based on said first key and coupled to receive said cipher blocks of said first group in a sequence;

means for exclusive ORing an output of said decryption unit with a previous cipher block of said first group with a previous cipher block of said second group; and an encryption unit based on said second key and coupled to receive blocks output from the exclusive OR means in said sequence to yield said cipher blocks of said second group; and wherein said decryption unit processes during a time span an X+1 cipher block of said first group, said exclusive OR means exclusive ORs during an initial portion of said time span an X block output from said decryption unit with an X−1 cipher block of said first group with an X−1 cipher block of said second group to yield an output, and said encryption unit processes during a latter portion of said time span the exclusive OR means output.

17. A system as set forth in claim 16 wherein said encryption unit processes the exclusive OR means output beginning after said initial portion, during a remainder of said time span and during an initial portion of a next one of said time spans.

18. A system as set forth in claim 16 wherein said decryption unit is loaded during an ending portion of said time span with an X+2 cipher block of said first group.

19. A system as set forth in claim 16 further comprising a buffer coupled to receive said cipher blocks of said first group and supply them to said exclusive OR means, and wherein said buffer is loaded during an ending portion of a previous time span with the X+1 cipher block of said first group.

20. A system as set forth in claim 16 further comprising a buffer interposed between an output of said encryption unit and said exclusive OR means to receive said cipher blocks of said second group and wherein said buffer is loaded during a latter initial portion of a next time span with an X cipher block of said second group.

21. A system as set forth in claim 20 further comprising a second buffer coupled to receive said cipher blocks of said first group and supply them to said exclusive OR means, and wherein said second buffer is loaded during an ending portion of a previous time span with an X+1 cipher block of said first group.

* * * * *